(12) United States Patent
Schnitta (10) Patent No.: US 9,181,695 B2
(45) Date of Patent: Nov. 10, 2015

(54) PERFORATION ACOUSTIC MUFFLER ASSEMBLY AND METHOD OF REDUCING NOISE TRANSMISSION THROUGH OBJECTS

(71) Applicant: Bonnie S. Schnitta, East Hampton, NY (US)

(72) Inventor: Bonnie S. Schnitta, East Hampton, NY (US)

(*) Notice: Subject to any disclaimer, the term of this patent is extended or adjusted under 35 U.S.C. 154(b) by 0 days.

(21) Appl. No.: 14/455,693

(22) Filed: Aug. 8, 2014

(65) Prior Publication Data

US 2015/0027806 A1 Jan. 29, 2015

Related U.S. Application Data

(63) Continuation-in-part of application No. 11/017,642, filed on Dec. 22, 2004, now Pat. No. 8,827,033.

(51) Int. Cl.
| | |
|---|---|
| *E04B 9/00* | (2006.01) |
| *B32B 7/02* | (2006.01) |
| *G10K 11/16* | (2006.01) |
| *G10K 11/168* | (2006.01) |
| *B32B 5/02* | (2006.01) |
| *B32B 5/24* | (2006.01) |
| *B32B 7/12* | (2006.01) |
| *E04B 2/74* | (2006.01) |

(52) U.S. Cl.
CPC .............. *E04B 9/001* (2013.01); *B32B 5/024* (2013.01); *B32B 5/24* (2013.01); *B32B 7/02* (2013.01); *B32B 7/12* (2013.01); *G10K 11/16* (2013.01); *G10K 11/168* (2013.01); *B32B 2262/101* (2013.01); *B32B 2307/102* (2013.01); *E04B 2/7409* (2013.01); *E04B 2/7457* (2013.01)

(58) Field of Classification Search
CPC ........ E04B 2/7409; E04B 9/001; H04R 1/021
USPC ................. 181/150, 155, 156, 199, 224, 225; 381/71.5; 362/217, 218, 362
See application file for complete search history.

(56) References Cited

U.S. PATENT DOCUMENTS

| | | | | | |
|---|---|---|---|---|---|
| 3,811,532 | A | * | 5/1974 | Everitt | 181/156 |
| 3,941,207 | A | * | 3/1976 | Croup | 181/199 |
| 3,985,200 | A | * | 10/1976 | Sepmeyer | 181/150 |
| 4,122,911 | A | * | 10/1978 | Croup | 181/199 |
| 4,296,280 | A | * | 10/1981 | Richie | 381/99 |
| 4,891,842 | A | * | 1/1990 | Green | 381/392 |
| 5,574,796 | A | * | 11/1996 | Keezer | 381/386 |
| 6,098,743 | A | * | 8/2000 | McGrath | 181/150 |
| 7,245,729 | B2 | * | 7/2007 | Bank et al. | 381/152 |
| 2003/0048918 | A1 | * | 3/2003 | Dillon et al. | 381/395 |
| 2007/0284183 | A1 | * | 12/2007 | Whitaker | 181/150 |

* cited by examiner

*Primary Examiner* — Jeremy Luks
(74) *Attorney, Agent, or Firm* — John F. Vodopia (57) ABSTRACT

A noise muffler is configured to substantially surround a sound generating object, disposed in or to be disposed in, a structure including a wall or ceiling to be sound limited by, and attenuate sound emitted from the sound generating object, the wall or ceiling including a board having an exposed surface and an opposite surface. The noise muffler has front, rear, left and right sides and a bottom. The sound generating object is positioned in the muffler cavity. The front, rear, left and right sides, and the bottom of the muffler are formed with an outer barrier layer. At least one of the front, rear, left, right sides and bottom of the muffler are formed with a noise absorbing layer positioned adjacent the outer barrier layer to absorb a predetermined amount of sound emitted from the object. At least one of the front, rear, left and right sides includes a first opening into the inner volume of the muffler cavity, the size of which first opening is adjustable.

12 Claims, 8 Drawing Sheets

PERFORATION ACOUSTIC MUFFLER ASSEMBLY AND METHOD OF REDUCING NOISE TRANSMISSION THROUGH OBJECTS

This application is a continuation-in-part (CIP) of U.S. patent application Ser. No. 11/017,642, filed on Dec. 22, 2004 ("the parent application"), which parent application is based on and derives the benefit of the filing date of U.S. Provisional Patent Application No. 60/530,981, filed Dec. 22, 2003 ("the provisional application"); the contents of both the parent application and the provisional are incorporated herein by reference.

BACKGROUND OF THE INVENTION

The present invention relates to a system for attenuating noise. In particular, the present invention relates to a system for attenuating noise that may be emitted from a room through a hole or opening. Additionally, the invention can attenuate noise when the opening houses any low STC object that cannot be completely enclosed, such as a recessed light fixture. The present invention further relates to a methodology for attenuating noise from a room that contains at least one hole or opening for receiving a low STC object that cannot be completely enclosed, such as a recessed light fixture or other mechanism.

Hearing noises such as for example, footsteps, speech, music or environmental sounds from adjacent rooms, upper floors, pipes, outside the dwelling or adjacent dwellings is something that many people experience on a daily basis. At a minimum, it can be distracting. Many spend large sums of money to reduce the overall transmission of sound into and/or through their dwellings in order to create quieter surroundings. Various sound insulating techniques exist to significantly reduce and/or limit the transmission of sound through the walls, ceilings and other objects contained in today's commercial and residential buildings. A great deal of attention is paid to the configuration of the walls, floors and ceilings and the materials forming the same to provide for high transmission loss, which minimizes the transmission of noise from one room or space to another.

The configuration and the materials are rated by its STC. STC stands for "sound transmission class" and is a single number rating derived from measured values of sound transmission loss in accordance with the American Society for Testing and Materials (ASTM) E90 standards. The transmission loss through an object is a measure of its effectiveness in preventing the sound power incident on one side of the object from being transmitted through it and radiated on the other side. The STC provides a single number estimate of an object's performance for certain common sound reduction applications.

Typically, ceilings and walls have openings and/or holes formed therein to receive various devices including electrical outlets, air ducts, lighting, speakers, etc. While the walls, floors and ceilings can be adequately insulated to limit noise transmission, these openings have an adverse impact on the transmission loss. As such, noise can enter the room or space through the opening and the device mounted therein.

SUMMARY OF THE INVENTION

In response to the foregoing challenges, applicant has developed an innovative noise attenuation system for use in a structure having a hole for some type of mechanism, such as a recessed light fixture mounted therein, which cannot be addressed with a complete acoustic enclosure, due to required air flow for heat dissipation, or a needed opening, such as when a large quantity of wires is required. The noise attenuation system is constructed to permit the absorption of noise emitted into the structure from the mechanism such that the transmission loss of the structure is not adversely impacted by the presence of the opening and the mechanism located therein. The noise attenuation system is also constructed to permit dissipation of heat from the mechanism, if required.

The noise attenuation includes a noise absorbing muffler positioned within the structure in an area substantially surrounding the mechanism. The noise absorbing muffler includes an outer high STC barrier layer that limits the passage of sound waves emitted from the mechanism therethrough. The noise absorbing muffler further includes a noise absorbing layer positioned adjacent to the outer barrier layer. The noise absorbing layer absorbs a predetermined amount of sounds waves emitted from the mechanism. An optional third layer can be secured to the barrier layer, which would be a noise decoupling layer. This is most commonly used when low frequency noise may need to be decoupled from the structure.

Applicant has also developed an innovative method for attenuating noise emitted from a recessed light fixture mounted in an opening in a structure. The method includes determining the minimum length of a noise attenuating muffler based upon a predetermined wavelength of a sound wave. Once the proper length of muffler is determined, the noise attenuating muffler is located within the structure in an area surrounding the mechanism. The noise attenuating muffler substantially absorbs the sound waves emitted into structure from the recessed fixture. Thus, when the sound exits the muffler the reduction in noise is equal to the transmission loss that would have occurred had there never been a hole.

In another embodiment, the invention provides a noise muffler configured to substantially surround a sound generating object, disposed in or to be disposed in, a structure including a wall or ceiling to be sound limited by, and attenuate sound emitted from the sound generating object, the wall or ceiling including a board having an exposed surface and an opposite surface.

The noise muffler comprises front, rear, left and right sides and a bottom connected to each of the front, rear, left and right sides to form a muffler cavity defining an inner volume. The sound generating object is positioned in the muffler cavity. The front, rear, left and right sides, and the bottom of the muffler are formed with an outer barrier layer. At least one of the front, rear, left, right sides and bottom of the muffler are formed with a noise absorbing layer positioned adjacent the outer barrier layer to absorb a predetermined amount of sound emitted from the object. At least one of the front, rear, left and right sides includes a first opening into the inner volume of the muffler cavity, wherein a size of the opening is adjustable.

Each of the front, rear, left and right sides are bordered by top, bottom, left and right ends, and wherein the left and right ends of each side is connected to the right and left ends of sides positioned to the left and right, respectively. The bottom is bordered with front, rear, left and rights ends, wherein each of the ends is connected to bottom ends of the front, rear, left and right sides to form the muffler cavity. A first primary flap is attached to and extending from an end of at least one of the front, rear, left, right sides of the muffler opposite the end attached to the bottom. The first opening in the at least one side is arranged proximate the first primary flap. A first secondary flap is arranged in the muffler proximate the first opening, opposite the first primary flap, and wherein a physical distance separating the first primary flap and the first secondary flap defines a size of the first opening.

The first secondary flap includes a first end and a second end and wherein a first extension member extends from the second end, substantially in parallel with the at least one side, for part of the extent of the at least one side between the top and bottom ends thereof, forming a first channel in fluid communication with the first opening. The first channel is in fluid communication with the volume of the muffler cavity. The first opening and the first channel together act as a baffle.

A second primary flap is attached to and extending from an end of another of the front, rear, left, right sides, which opposes the at least one side of the muffler, opposite the end attached to the bottom. A second opening is included in the another side arranged proximate the second primary flap. A second secondary flap is arranged in the muffler proximate the second opening, opposite the second primary flap, and wherein a physical distance separating the second primary flap and the second secondary flap defines a size of the opening. The second secondary flap includes a first and end a second end and wherein a second extension member extends from the second end, substantially in parallel with the another side, for part of the extent of the another side between the top and bottom ends thereof, forming a second channel in fluid communication with the second opening. The second channel is in fluid communication with the volume of the muffler cavity. The first and second openings are in fluid communication with each other through the first and second channels and inner volume of the muffler cavity. Preferably, the size of the opening is adjustable by adjusting a position of the first primary flap.

BRIEF DESCRIPTION OF THE DRAWINGS

The invention will be described in conjunction with the following drawings in which like reference numerals designate like elements and wherein.

DETAILED DESCRIPTION OF THE INVENTION

Figure 1:
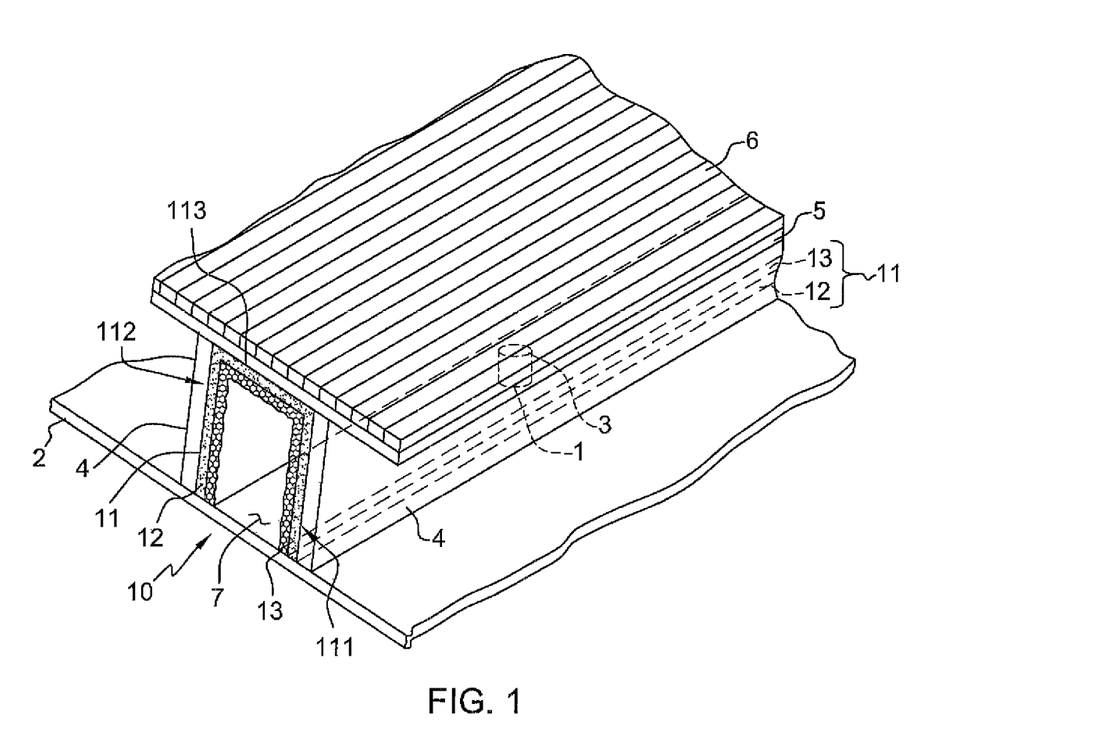
FIG. 1 is a perspective view illustrating the noise attenuation system in accordance with an embodiment of the present invention whereby the noise attenuation system is positioned between upper and lower floors.
Figure 2:
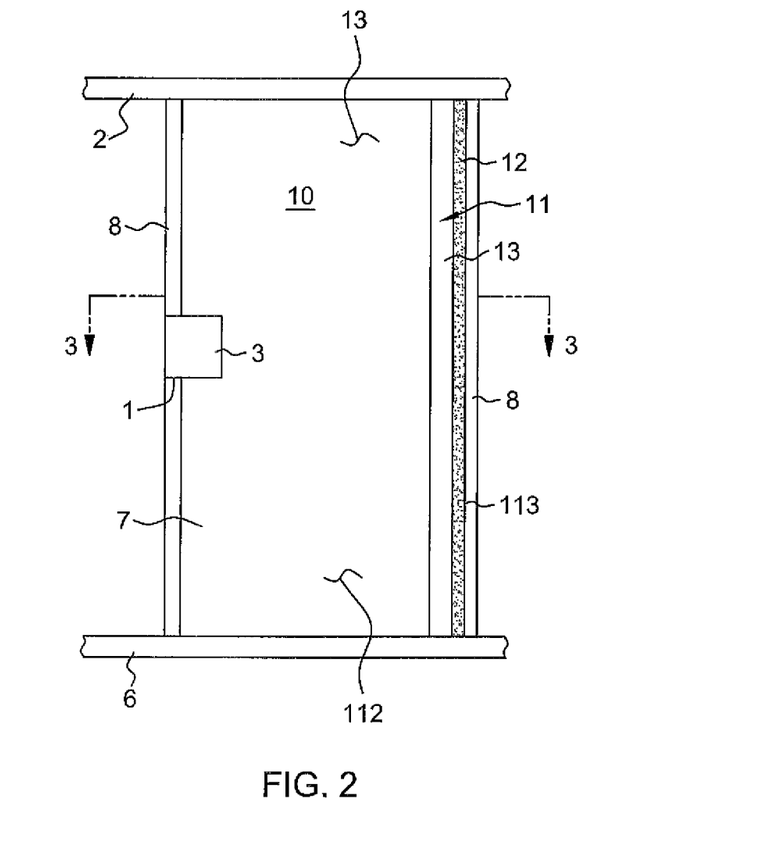
FIG. 2 is a partial side cross-sectional view of the noise attenuation system in accordance with the present invention positioned between adjoining walls.
Figure 3:
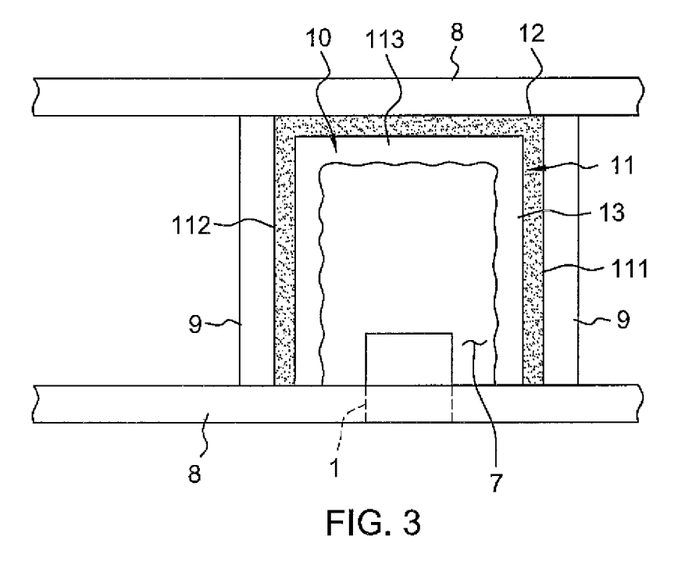
FIG. 3 is a cross-sectional view of the noise attenuation system taken along the 3-3 line in FIG. 2.

A system 10 for attenuating noise will now be described in greater detail in connection with FIGS. 1-4. For purpose of illustration, the system 10 for attenuating noise will be described in connection with the attenuation of noise associated with an opening 1 formed in a ceiling 2 for receipt of a mechanism 3, as illustrated in FIG. 1. The noise attenuation system 10 can also be used to attenuate noise associated with an opening formed in a wall 8, as shown in FIGS. 2 and 3. In accordance with the present invention, the mechanism 3 can be a recessed light fixture or any component that is recessed in a wall or ceiling including but not limited to electric outlet boxes, speakers, intercoms, exhaust fans, electrical heaters, video equipment including cameras and monitors and the like. Typically, the mechanism 3 is positioned between a pair of joists 4 or wall studs 9. The joists 4 or studs 9 can be located between walls 8, as shown in FIGS. 2 and 3, or between the ceiling 2 and the subfloor 5, as shown in FIG. 1. The mechanism 3 can be mounted to one or both of the joists 4. It is also contemplated that the mechanism 3 can be solely supported by the ceiling 2, wall 8 or by a bracket (not shown) connected to one or more of the joists 4, the studs 9, wall 8 or the subfloor 5. The ceiling 2 of the room or space is attached to the lower side of joists 4. The subfloor 5 of the upper floor of an upper room is attached to the upper side of the joists 4. A flooring material 6 is then secured to the subfloor 5. In a wall installation, the walls 8 are connected to the sides of the studs 9.

In order to improve the transmission loss of noise between the ceiling 2 and the subfloor 5 and flooring material 6 or the walls 8, the noise attenuating system 10 includes a noise muffler 11 that is located in the area 7 surrounding, but usually not contacting the mechanism 3, as shown in FIGS. 1-3. The noise muffler 11 includes an outer barrier layer 12. The barrier layer 12 can be formed from a material, with a high STC barrier. The barrier layer 12 can be formed of a loaded vinyl (e.g., a one pound per square foot loaded vinyl). The barrier layer 12 can be formed from a material having an STC rating that is equal to or greater than the STC rating of the wall 8, floor 5, 6 or ceiling 2 when measured without the opening 1. Additionally, the material forming the barrier layer 12 can be a non-rigid material such that the layer 12 can be molded, shaped or manipulated to conform to the joists 4 and subfloor 5 or wall 8 in the vicinity of area 7. A more rigid form of the material can also be used when providing noise attenuation in an area having predetermined dimensions. The barrier layer 12 has a suitable STC rating such that any noise emitted from the mechanism 3 in the area substantially remains in the area 7 while the sound waves travel within the muffler 11.

Figure 5:
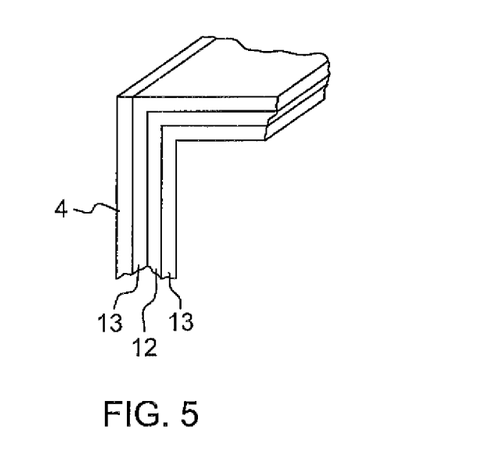
FIG. 5 is a partial perspective view illustrating a variation of the noise attenuation system in accordance with the present invention.

The noise muffler 11 further includes a noise absorbing layer 13, which is attached to or lines at least one side of the barrier layer 12, as shown in FIGS. 1 and 2. As shown in FIG. 5, the noise muffler 11 can include a pair of noise absorbing layers 13, which are located on opposing sides of the barrier layer 12. The second noise absorbing layer can function as a decoupler for potential low frequency noises. The sound waves emitted from the mechanism 3 are absorbed by the noise absorbing layer 13 before it exits the muffler 11. With such a construction, a suitable transmission loss is achieved. The noise absorbing layer 13 is preferably a high NRC rated material, where "NRC" stands for noise reduction coefficient and represents the average amount of sound absorbed by the material. The NRC rating typically ranges from 0.01 to 1.0. NRC ratings above 1 (e.g., 1.03) are also possible. The higher NRC rating, the greater the sound absorption. The noise absorbing layer 13 is chosen based upon the characteristics of the particular mechanism 3.

Various materials are contemplated. In particular, the material forming the layer 13 is chosen for its sound absorbing qualities and its ability to withstand any heat emitted from the mechanism 3. As such, the material forming layer 13 for noise attenuation of a recessed stereo speaker can differ from the material used for noise attenuation of a recessed lighting fixture 3. Fiberglass and glass wool are considered to be suitable materials for the noise absorbing layer 13 for their sound absorbing and fire resistant qualities. The layer 13 may also be formed from a closely woven textile-like material formed from any suitable material provided the material has suitable sound absorbing properties and withstands a predetermined temperature. Additionally, it is preferable that the noise absorbing layer 13 be formed from a class A fire rated material. A suitable adhesive can be used to secure the noise absorbing layer 13 to the barrier layer 12. When multiple noise absorbing layers 13 are provided (e.g., FIG. 5), the layers can be formed from either the same material or a different material. Alternatively, the noise absorbing layer 13 can be connected to the barrier layer 12 when the layers 12 and 13 are secured to the joists 4 or subfloor 5 using suitable fasteners (not shown).

In the case of the stereo speaker, it is not necessary that the layer 13 withstand higher temperatures; rather, it is important that the material have high noise or sound absorption qualities to absorb the noise emitted into the area 7 by the speaker that may be transmitted through the joists 4 and the subfloor 5 and floor 6 into adjacent spaces. The barrier layer 12 will attenuate the noise that may be transmitted through the floor into the space above through the joists 4 and the ceiling 2, while the noise absorbing layer 13 will absorb noise emitted into the area 7 by the speaker. Furthermore, it is important that the material does not adversely affect the acoustic wave of the speaker for the desired sound to be emitted into the space.

In contrast, the material for the layer 13 used in connection with a recessed lighting fixture must be able to withstand higher temperatures emitted from the mechanism 3. The noise absorbing qualities of the material in this application are not as important because the barrier layer 12 will provide the primary noise attenuation. The muffler 11 can be sized to permit the dissipation of heat from the recessed fixture, if required.

As shown in FIGS. 1-3, the noise muffler 11 preferably includes sides 111 and 112, which extend along the joists 4 adjoining the area 7. An upper portion 113 is positioned adjacent the subfloor 5 (FIG. 1) or wall 8 (FIG. 3). The noise muffler 11 is preferably formed with open ends to permit venting. The noise muffler 11 can also include ends, not shown, when heat venting is not required such as for speaker enclosures and electric outlets, which extend between the joists 4 from the subfloors 5 to the ceiling. The ends, however, are not necessary if the length of the muffler is long enough, because the noise absorbing layer 13 substantially absorbs the sound waves before the sound waves can exit the ends of the muffler 11. The muffler 11 can provide a noise absorbing barrier having an STC rating that is equal to or greater than the ceiling and surrounding structure or wall and surrounding structure depending on the placement of the mechanism 3. As an example, the muffler 11 would travel from the ceiling up the joist 4 along the subfloor 5 above and down the other joist 4 to the ceiling 2 attached to the adjacent joist 4. As shown in FIG. 1, the muffler 11 surrounds the mechanism 3. The muffler 11 is intended to contain the noise generated from the mechanism 3 and/or transmitted through the walls, ceilings, joists, studs and floors of adjacent spaces thus creating a situation where the energy of the acoustic wave is forced to travel through the muffler 11. The muffler 11 is sized such that as the sound waves travel within the muffler 11, the sound waves are substantially absorbed by the layer 13 such that the noise is absorbed by the layer 13 before exiting the muffler 11.

The size of the muffler 11 may vary according to the particular noise attenuation application. The size of the muffler 11 is determined based upon several parameters including, but not limited to the heat generated from the mechanism 3 such that proper ventilation can be provided, the frequency of the noise to be contained by the muffler 11, the amount of transmission loss required, and the material used to form the layer 13. The number of fixtures 3 placed in a particular area will also impact the size of the muffler 11. For example, the number of recessed lights which may be located in a linear arrangement such that they are positioned between the same two joists 4 will impact the size of the muffler 11. The muffler 11 may be sized to extend the length of the joists 4 such that a single muffler 11 is provided for noise attenuation and proper ventilation.

Whatever the absorbing material chosen for the layer 13, it will attenuate the acoustic energy of the noise source (i.e., the fixture 13). Since absorbers have a known noise absorption in a specific frequency, the length of the muffler 11 is to be governed by the frequency of concern and the material used. The length is determined such that the noise emitted from the mechanism 3 is substantially absorbed by the muffler 11 before exiting the muffler 11. Any remaining sound waves are absorbed or reduced by the surrounding structure (i.e., ceilings 2, wall 8 and joists 4 and any sound insulating materials located therein. As such, the STC rating of the structure containing the opening 1 with the mechanism 3 can be substantially the same as the structure without the opening 1 and the mechanism 3. The length of the noise muffler 11 can be determined based upon a determination of the wavelength A of the noise. The wavelength A is determined based upon the velocity of the sound waves $v_w$ and the frequency f of the noise where:

$$\lambda = v_w/f$$

Figure 4:
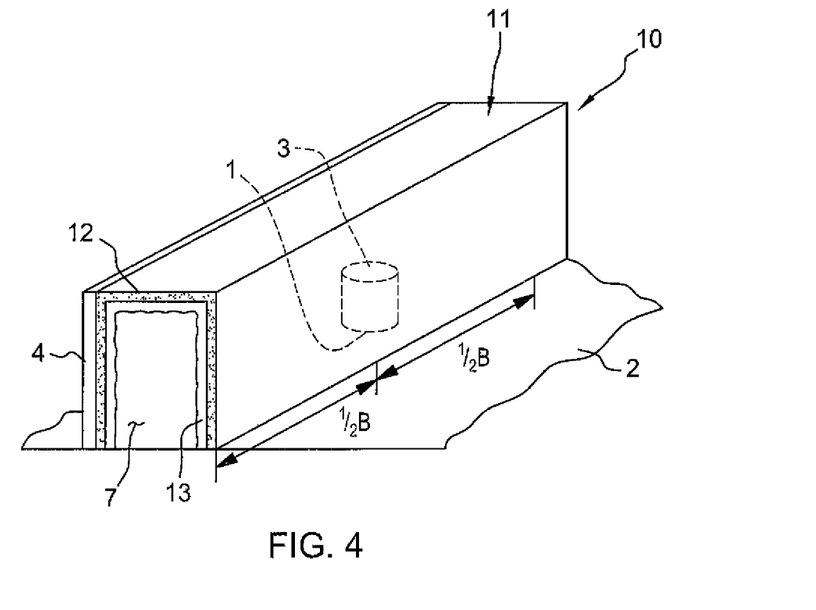
FIG. 4 is a perspective view illustrating the length of the noise attenuation system in accordance with the present invention.

As shown in FIG. 4, the minimum length of the muffler 11 is .beta. where:

$$\beta = 2\lambda/NRC$$

The NRC rating is chosen based upon the material forming layer 13 at a given frequency f.

EXAMPLE 1

The frequency f of concern is 500 Hz. The velocity of the sound wave $v_w$ is 1100 ft./sec. Using this information, the approximate desired length of the muffler 11 can be determined.

$$\lambda = (1100 \text{ ft./sec})/500 \text{ Hz} = 2.2 \text{ ft.}$$

The NRC coefficient for a material for using in absorbing sound waves with a frequency f of 500 Hz is 0.85.

$$\beta = 2\lambda/NRC = 2(2.2 \text{ ft.})/0.85 = 5.2 \text{ ft.}$$

The minimum length of the muffler 11 is approximately 5.2 ft. with the mechanism 3 being located approximately in the center of the muffler 11 (i.e., ½β as shown in FIG. 4). This determined minimum length of the muffler 11 will provide adequate noise attenuation whereby the sound waves will be absorbed prior to exiting the muffler 11 and can provide sufficient space to permit ventilation of the mechanism 3 and dissipation of any heat emitted from the mechanism 3.

EXAMPLE 2

The frequency f of concern is 125 Hz. The velocity of the sound wave $v_w$ is 1000 ft./sec. Using this information, the approximate length of the muffler 11 can be determined.

$$\lambda = (1100 \text{ ft./sec})/125 \text{ Hz} = 8.8 \text{ ft.}$$

The NRC coefficient for a material for using in absorbing sound waves with a frequency f of 125 Hz is 0.65.

α=2λ/NRC=2(8.8 ft.)/0.65=27 ft.

The minimum length of the muffler 11 is approximately 27 ft. with the mechanism 3 being located approximately in the center of the muffler 11 (i.e., ½β as shown in FIG. 4). This determined length of the muffler 11 will provide adequate noise attenuation whereby the sound waves will be absorbed prior to exiting the muffler 11 and can provide sufficient space to permit ventilation of the mechanism 3 and dissipation of any heat emitted from the mechanism 3.

It is intended that the noise attenuation system 10 in accordance with the present invention may be installed during the construction phase of the structure or as a retrofit after construction, but during the installation of the fixtures 3 during for example a home or office remodeling. The installation of the system 10 during a retrofit or remodel may require the removal of a least a portion of the wall or ceiling 2 to permit insertion of the muffler 3.

Additionally, any insulation located between the joists 4 would also have to be removed in the area surrounding the mechanism 3, if heat ventilation is required.

While the above-described embodiments show system 10 are described in connection with the attenuation of noise associated with an opening 1 formed in a ceiling 2 or wall 8 for receipt of a mechanism 3 (FIG. 1-5), FIGS. 6A, 6B and 7A-7C depict a noise attenuation system 10' that comprising a muffler 11' that is not required (but may be) directly mounted in a wall or ceiling. Noise muffler 11' is instead constructed to receive a mechanism 3 in an open cavity 110 formed with 5 sides (bottom 122, front end 123, rear end 124, left side 125 and right side 126), where at least one of the front and rear ends 123, 124 or, the left and right sides 125, 126 is partially open. The size of the opening (or openings where both sides or ends are partially open) is adjustable in an amount required by the nature of the mechanism 3 to be surrounded thereby.

The overall size of the muffler 11' may vary according to the size of the particular mechanism 3 for which it is to substantially enclose, as well as the heat generated from the mechanism 3. For that matter, each of the front end 123, rear end 124, left side 125 and right side 126 include respective flaps 123a, 124a, 125a and 126a, attached and extending along the side ends opposing the side ends that connect to the 4 bottom ends. The flaps 123a, 124a, 125a and 126a pivot, due to the flexibility of their nature, and the flexibility of their connection to the respective sides, almost 360° in order that they may be aligned in parallel with the sides, either inside or outside of the cavity 110. The muffler 11', therefor, operates like a pouch (a preferably rectangular pouch), with flaps. The flaps may be used to secure the muffler to a structure to which the mechanism is affixed, or to the structure itself, for example, by nailing, stapling, gluing, etc., without limitation.

Figure 6A:
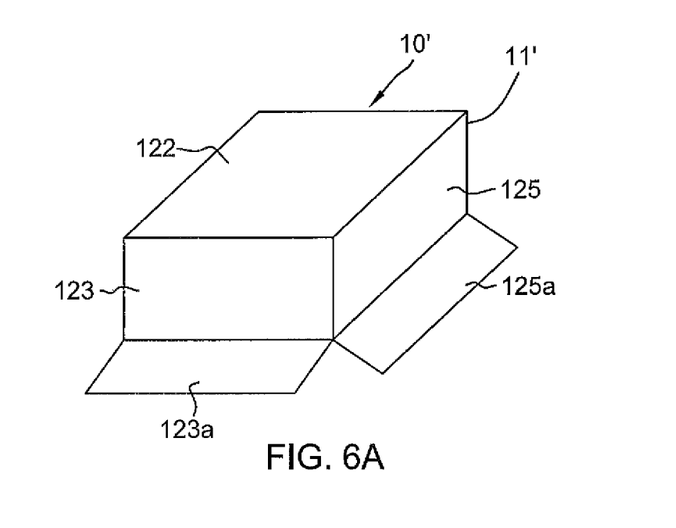
FIG. 6A is a schematic diagram depicting a side perspective view of the noise muffler of the invention.
Figure 6B:
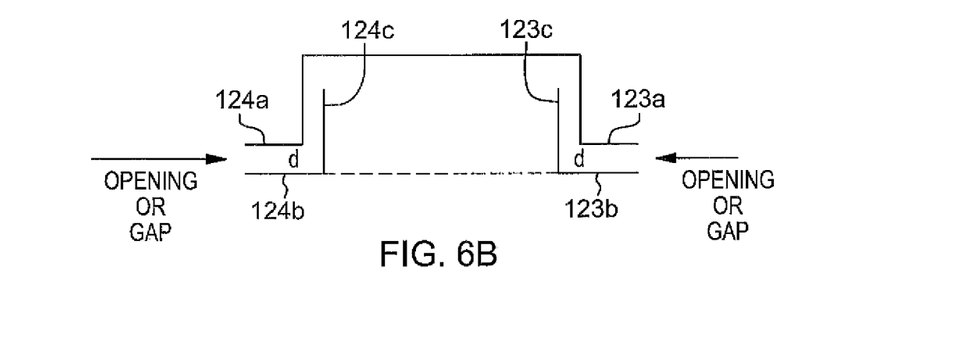
FIG. 6B is a schematic diagram depicting side cross-sectional view of the noise muffler of FIG. 6A.
Figure 7A:
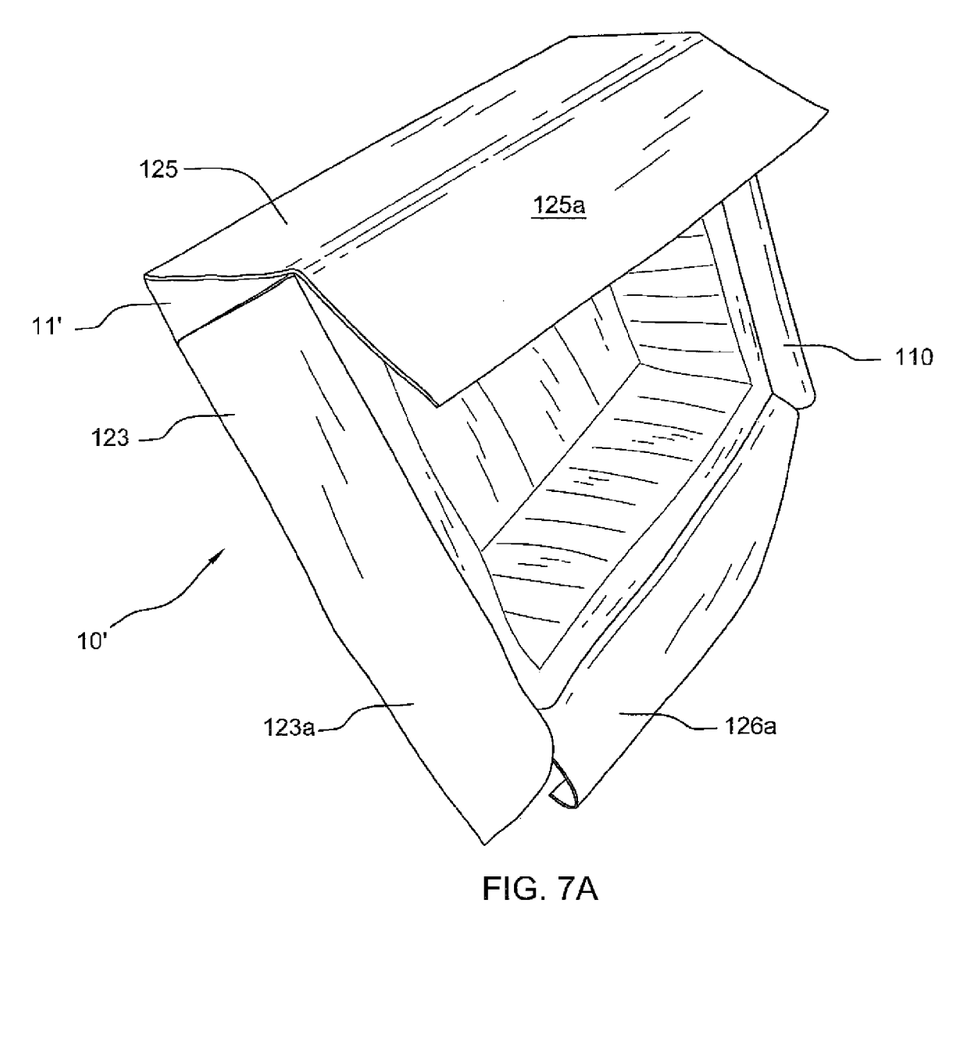
FIG. 7A is a perspective view of another embodiment of the noise attenuation system of the invention, comprising a noise muffler for substantially completely surrounding and attenuating noise associated with a mechanism.
Figure 7B:
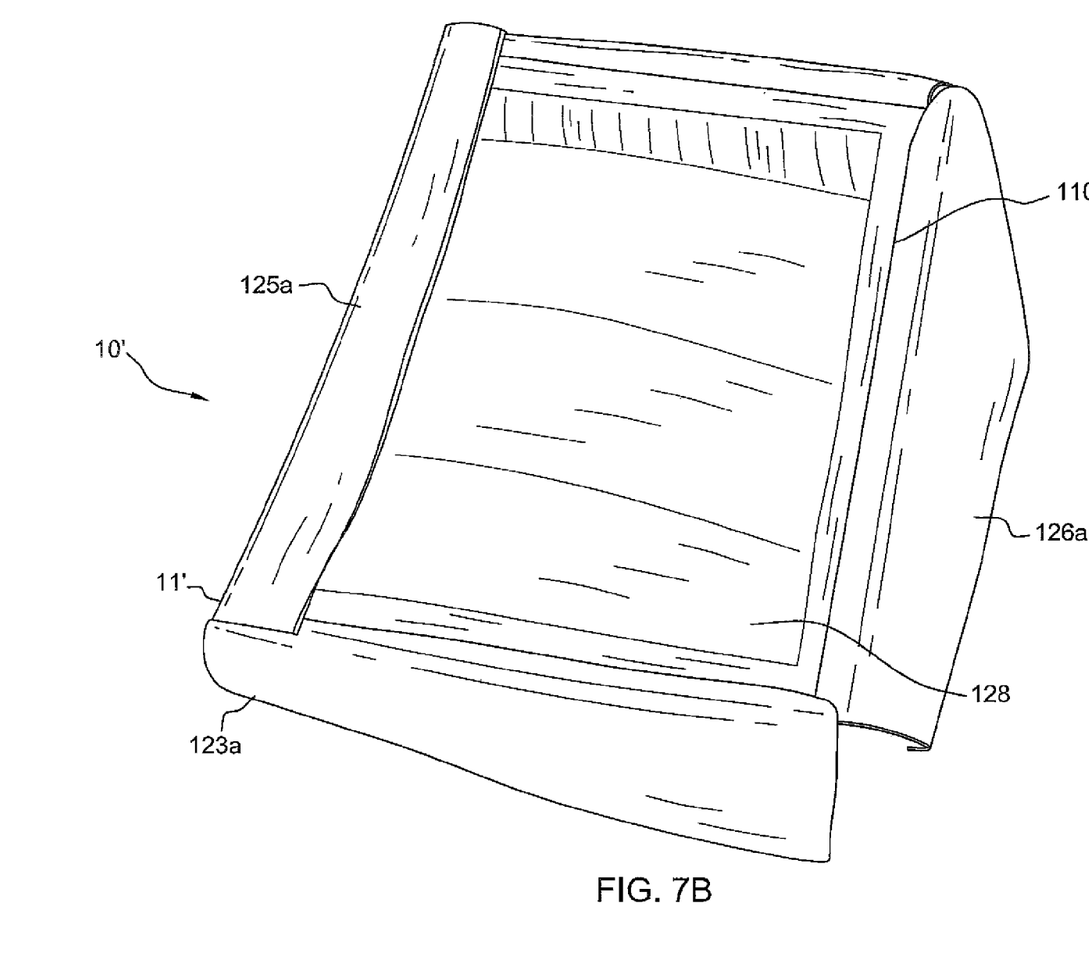
FIG. 7B is a top plan view looking into a cavity formed by the noise muffler construction of FIG. 7A.
Figure 7C:
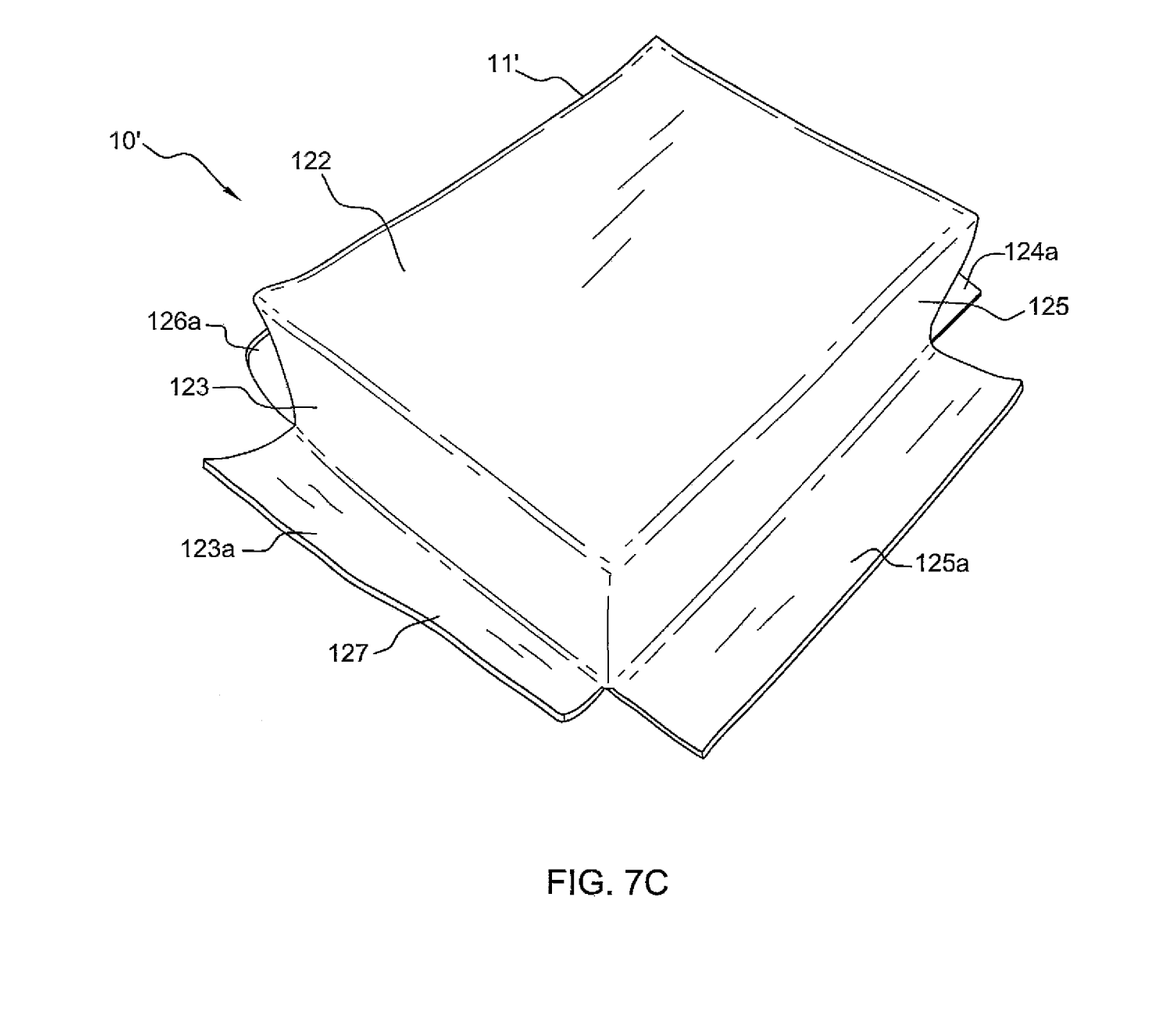
FIG. 7C is a bottom perspective view of the noise muffler of FIGS. 7A and 7B.

At least one of the front and rear ends 123, 124, or the left and right sides 125, 126 of the muffler 11' include an opening, the size of which is adjustable. FIG. 6B shows one exemplary embodiment where the opening is provided in rear end 124. The opening is created by including a second flap 124b separated from the first flap 124a by a gap, the second flap 124b arranged to extend horizontally (in FIG. 6B to highlight the gap or partial opening) to a second inner side wall 124c, between the inner surface of the rear end 124 and the inner volume of the cavity 110. The gap or partial opening between the inner surface of the rear end 124 and the inner volume of the cavity 110 extends to an opening into the inner volume of the cavity 110 (near the inner surface of bottom 122), essentially forming a "baffled" path for air flow, wires, etc., from outside the muffler 11' to the inner volume of the cavity 110 and of course the mechanism substantially enclosed or to be substantially enclose therein.

By adjusting the positioning of the first flap 124 and the second flap 124a, and/or the length of the height or the rear end 124, the size of the opening or gap is adjustable. For example, where the mechanism 3 is a loud speaker, the size of the gap or opening may be minimal, as only minimal heat builds up in the inner volume of the muffler 11' during intended use. However, if the mechanism is a light or other mechanism that generates a fair amount of heat in normal use, the gap or opening must be substantially larger, in worst case circumstance being an entirely open end. Likewise, the opposing or front end 123 may include a second flap 123b and inner wall 123c, that enable adjust the size of an opening or gap at the other end. The reader should note that the gaps or openings are not limited to being provided in the front end, the rear end or both, but me be positioned in additionally or replacedly in at least one or both of the left 125 and right 126 sides, without deviating from the scope and spirit of the invention.

In order to improve the transmission loss of noise generated by a mechanism inside the cavity 110, all 5 sides (bottom 122, front end 123, rear end 124, left side 125 and right side 126) of the noise muffler 11' include an outer barrier layer 127. The outer barrier layer 127 can be formed from a material, with a high STC barrier, for example, formed of a loaded vinyl (e.g., a one pound per square foot loaded vinyl). Additionally, the material forming the barrier layer 127 can be a non-rigid material such that the layer 127 can be molded, shaped or manipulated to conform to any location at which the mechanism is to be or is positioned. A more rigid form of the material can also be used when providing noise attenuation in an area having predetermined dimensions.

The noise muffler 11' further includes a noise absorbing layer 13, which is attached to or lines at least one (but preferably all 5) sides (bottom 122, front end 123, rear end 124, left side 125 and right side 126) of the muffler 11'. For that matter, while not expressly shown in FIGS. 6A, 6B, &A, 7B and 7C, the noise muffler 11' can include a pair of noise absorbing layers 13, which are located on opposing sides of the barrier layer 12. The second noise absorbing layer can function as a decoupler for potential low frequency noises. The sound waves emitted from the mechanism 3 are absorbed by the noise absorbing layer 13 before it exits the muffler 11'. With such a construction, a suitable transmission loss is achieved. The noise absorbing layer 13 is preferably a high NRC rated material, where "NRC" stands for noise reduction coefficient and represents the average amount of sound absorbed by the material. The noise absorbing layer 13 is chosen based upon the characteristics of the particular mechanism 3.

Various materials are contemplated. In particular, the material forming the layer 13 is chosen for its sound absorbing qualities and its ability to withstand any heat emitted from the mechanism 3. As such, the material forming layer 13 for noise attenuation of a recessed stereo speaker can differ from the material used for noise attenuation of a recessed lighting fixture 3. Fiberglass and glass wool are considered to be suitable materials for the noise absorbing layer 13 for their sound absorbing and fire resistant qualities. The layer 13 may also be formed from a closely woven textile-like material formed from any suitable material provided the material has suitable sound absorbing properties and withstands a predetermined temperature.

Additionally, it is preferable that the noise absorbing layer 13 be formed from a class A fire rated material. A suitable adhesive can be used to secure the noise absorbing layer 13 to the barrier layer 12. When multiple noise absorbing layers 13 are provided, the layers can be formed from either the same material or a different material. In the case of the stereo speaker, it is not necessary that the layer 13 withstand higher temperatures; rather, it is important that the material have high noise or sound absorption qualities to absorb the noise emitted by the speaker. The barrier layer 12 will attenuate the noise that may be transmitted from the back of the speaker (or other mechanism), while the noise absorbing layer 13 will absorb noise emitted by the speaker. Furthermore, it is important that the material does not adversely affect the acoustic wave of the speaker for the desired sound to be emitted into the space.

In contrast, the material for the layer 13 used in connection with a recessed lighting fixture must be able to withstand higher temperatures emitted from the mechanism 3. The noise absorbing qualities of the material in this application are not as important because the barrier layer 12 will provide the primary noise attenuation. The muffler 11' can be sized to permit the dissipation of heat from the recessed fixture, if required.

It will be appreciated that numerous modifications to and departures from the preferred embodiments described above will occur to those having skill in the art. The present invention is not intended to be limited to sound insulation between the floor and ceiling of a structure, rather, the system 10 can be used between walls or in any structure where sound insulation is desired.

Furthermore, the terminology fixture is not intended to be limited to recessed lighting; rather, the terminology fixture may include any component that may be mounted in a recess or hole in a wall, ceiling or other structure. Furthermore, the muffler 11 can be used in any application where it is desirable to increase transmission loss through the recessed fixture and/or provided ventilation of the recessed fixture to permit dissipation of heat from the recessed fixture when necessary, or just an opening for such items as extensive wiring. It is also contemplated that the noise absorbing layer 13 can be formed from one or more layers which together form the layer 13. Thus, it is intended that the present invention covers the modifications and variations of the invention, provided they come within the scope of the appended claims and their equivalents.

What is claimed is:

1. A noise muffler configured to substantially surround a sound generating object where the sound generating object is positioned and attenuate sound emitted from the sound generating object, the noise muffler comprising:
   front, rear, left and right sides;
   a bottom connected to each of the front, rear, left and right sides to form a muffler cavity defining an inner volume;
   wherein the sound generating object is enclosed by the muffler cavity;
   wherein the front, rear, left and right sides, and the bottom of the muffler are formed with an outer barrier layer;
   wherein the front, rear, left and right sides, and the bottom of the muffler are formed with a noise absorbing layer adhered to the outer barrier layer to absorb a predetermined amount of sound emitted from the object, reflected back from the barrier layer or both;
   wherein one side of the front, rear, left and right sides includes a first opening into the inner volume of the muffler cavity; and
   wherein a size of the first opening is adjustable, wherein the first opening is formed by a first primary flap that is attached to and extending from an end of the one side opposite an other end of the one side that is attached to the bottom and a first secondary flap attached to an inner side wall of the muffler, the first secondary flap disposed opposite the first primary flap and wherein a physical distance separating the first primary flap and the first secondary flap defines a size of the first opening.

2. The noise muffler as recited in claim 1, wherein each of the front, rear, left and right sides are bordered by top, bottom, left and right ends, and wherein the left and right ends of each side is connected to the right and left ends of sides positioned to the left and right, respectively.

3. The noise muffler as recited in claim 2, wherein the bottom is bordered with front, rear, left and rights ends, wherein each of the ends is connected to bottom ends of the front, rear, left and right sides to form the muffler cavity.

4. A noise muffler configured to substantially surround a sound generating object where the sound generating object is positioned and attenuate sound emitted from the sound generating object, noise muffler comprising:
   front, rear, left and right sides;
   a bottom connected to each of the front, rear, left and right sides to form a muffler cavity defining an inner volume;
   wherein the sound generating object is enclosed by the muffler cavity;
   wherein the front, rear, left and right sides and the bottom of the muffler are formed with an outer barrier layer and with a noise absorbing layer positioned adjacent the outer barrier layer to absorb a predetermined amount of sound emitted from the object reflected back from the barrier layer or both;
   wherein one of the front, rear, left and right sides includes a first opening into the inner volume of the muffler cavity that is formed with a first primary flap attached to and extending from an end of the one of the sides of the muffler opposite the end attached to the bottom and a first secondary flap attached to an inner side wall of the muffler, the first secondary flap disposed opposite the first primary flap;
   wherein a physical distance separating the first primary flap and the first secondary flay defines a size of the first opening; and
   wherein the first secondary flap includes a first end and a second end and wherein a first extension member extends from the second end, substantially in parallel with the at least one side, for part of the extent of the at least one side between the top and bottom ends thereof, forming a first channel in fluid communication with the first opening.

5. The noise muffler as recited in claim 4, wherein the first channel is in fluid communication with the volume of the muffler cavity.

6. The noise muffler as set forth in claim 4, wherein the first opening and the first channel together act as a baffle.

7. The noise muffler as recited in claim 4, wherein a second primary flap is attached to and extending from an end of another of the sides, which opposes the at least one side of the muffler, opposite the end attached to the bottom.

8. The noise muffler as recited in claim 7, wherein a second opening is included in the another side arranged proximate the second primary flap.

9. A noise muffler configured to substantially surround a sound generating object where the sound generating object is positioned and attenuate sound emitted from the sound generating object, the noise muffler comprising:

front, rear, left and right sides; and a bottom connected to each of the front, rear, left and right sides to form a muffler cavity defining an inner volume;

wherein the sound generating object is enclosed by the muffler cavity;

wherein the front, rear, left and right sides and the bottom of the muffler are formed with an outer barrier layer and a noise absorbing layer positioned adjacent the outer barrier layer to absorb a predetermined amount of sound emitted from the object, reflected back from the barrier layer or both;

wherein one of the front, rear, left and right sides includes a first opening into the inner volume of the muffler cavity formed with a first primary flap attached to and extending from an end of the one of the sides opposite an end attached to the bottom and a first secondary flap attached to a first inner side wall of the muffler, the first secondary flap disposed opposite the first primary flap proximate the first opening;

wherein another one of the front, rear, left and right sides includes a second opening into the inner volume of the muffler cavity, a second primary flap attached to and extending from an end of the another one of the sides opposite an end attached to the bottom and a second secondary flap attached to a second inner side wall of the muffler, the second secondary flap disposed opposite the first secondary flap proximate the second opening; and wherein a physical distance separating the first primary flap and the second primary flap and a physical distance separating the second primary flap and the second secondary flap defines a size of the first and second openings, respectively.

10. The noise muffler as recited in claim 9, wherein the second secondary flap includes a first end and a second end and wherein a second extension member extends from the second end, substantially in parallel with the another side, for part of the extent of the another side between the top and bottom ends thereof, forming a second channel in fluid communication with the second opening.

11. The noise muffler as recited in claim 10, wherein the second channel is in fluid communication with the volume of the muffler cavity.

12. The noise muffler as recited in claim 11, wherein the first and second openings are in fluid communication with each other through the first and second channels and inner volume of the muffler cavity.

\* \* \* \* \*